US012532131B2

(12) United States Patent
Harlander et al.

(10) Patent No.: US 12,532,131 B2
(45) Date of Patent: Jan. 20, 2026

(54) METHOD FOR OPERATING A HEARING AID AND HEARING AID

(71) Applicant: Sivantos Pte. Ltd., Singapore (SG)

(72) Inventors: Niklas Harlander, Erlangen (DE); Christoph Lüken, Erlangen (DE); Matthias Müller-Wehlau, Erlangen (DE)

(73) Assignee: Sivantos Pte. Ltd., Singapore (SG)

( * ) Notice: Subject to any disclaimer, the term of this patent is extended or adjusted under 35 U.S.C. 154(b) by 221 days.

(21) Appl. No.: 18/311,380

(22) Filed: May 3, 2023

(65) Prior Publication Data

US 2023/0362555 A1 Nov. 9, 2023

(30) Foreign Application Priority Data

May 3, 2022 (DE) ..................... 10 2022 204 349.9

(51) Int. Cl.
*H04R 25/00* (2006.01)

(52) U.S. Cl.
CPC ......... *H04R 25/505* (2013.01); *H04R 25/604* (2013.01); *H04R 25/609* (2019.05); *H04R 2460/11* (2013.01)

(58) Field of Classification Search
CPC .. H04R 25/505; H04R 25/609; H04R 25/604; H04R 2460/11; H04R 1/2823; H04R 1/2826; H04R 1/2846; H04R 1/2849
See application file for complete search history.

(56) References Cited

U.S. PATENT DOCUMENTS

| | | | | |
|---|---|---|---|---|
| 6,549,635 | B1 | 4/2003 | Gebert | |
| 2009/0041260 | A1 | 2/2009 | Jorgensen et al. | |
| 2018/0184217 | A1 | 6/2018 | Rosenkranz et al. | |
| 2023/0027782 | A1 * | 1/2023 | Bramsløw | H04R 25/356 |

FOREIGN PATENT DOCUMENTS

| | | | |
|---|---|---|---|
| DE | 19942707 | A1 | 3/2001 |
| DE | 102010007336 | A1 | 8/2011 |
| EP | 3419310 | A1 | 12/2018 |
| EP | 3627848 | A1 | 3/2020 |
| EP | 3681175 | A1 | 7/2020 |
| EP | 4120698 | A1 | 1/2023 |

OTHER PUBLICATIONS

Jacobsen, Simon, "Mitigation of comb filter effects by in-situ amplitude-phase measurements and gain table manipulation with a mobile hearing aid prototype", Bachelor Thesis, Nov. 7, 2019, p. 1-65, XP093001311, University Oldenburg, Internet: http://oops.uni-oldenburg.de/4591/1/bachelor_thesis_simon_jacobsen_compressed.pdf.

* cited by examiner

*Primary Examiner* — Mark Fischer
(74) *Attorney, Agent, or Firm* — Laurence A. Greenberg; Werner H. Stemer; Ralph E. Locher

(57) ABSTRACT

A method operates a hearing aid, in particular a classic hearing aid. The hearing aid includes an input transducer, a signal processing device, and an output transducer. Wherein an occurrence of a comb filter effect is determined by the signal processing device, and wherein a countermeasure is controlled by the signal processing device as a function of the determined occurrence of the comb filter effect.

8 Claims, 1 Drawing Sheet

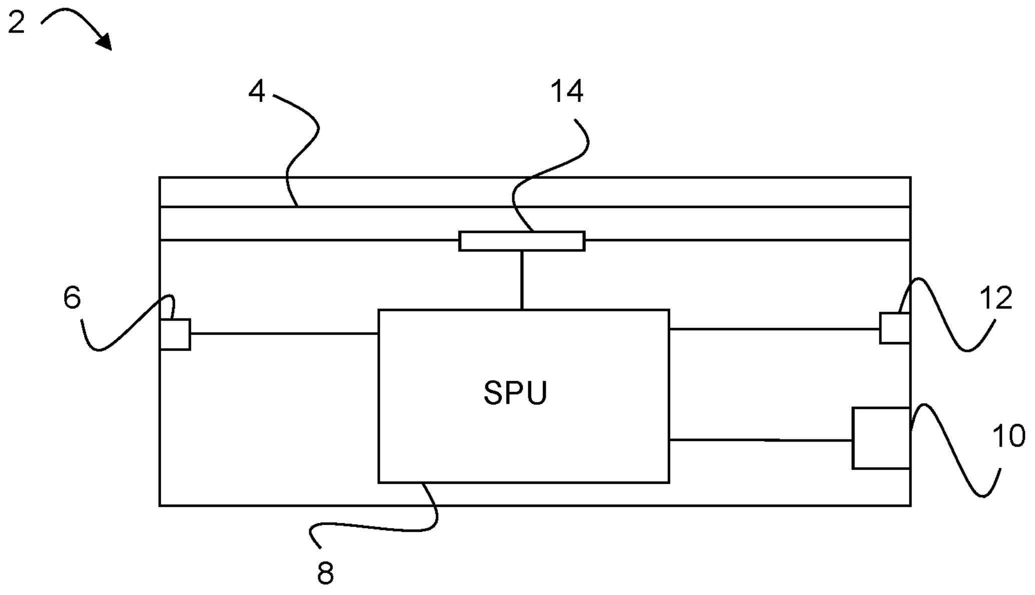
2
4
14
6
12
SPU
10
8

METHOD FOR OPERATING A HEARING AID AND HEARING AID

CROSS-REFERENCE TO RELATED APPLICATION

This application claims the priority, under 35 U.S.C. § 119, of German Patent Application DE 10 2022 204 349.9, filed May 3, 2022; the prior application is herewith incorporated by reference in its entirety.

FIELD AND BACKGROUND OF THE INVENTION

The invention relates to a method for operating a hearing aid, in particular a classic hearing aid. In addition, the invention relates to a hearing aid.

Typically, classic hearing aids, which are used to care for the hard of hearing, are referred to as hearing aids. However, in the broader meaning this term also refers to devices which are configured to assist persons having normal hearing. Hearing aids for assisting persons having normal hearing are also designated as "Personal Sound Amplification Products" or "Personal Sound Amplification Devices" (abbreviated: "PSAD"). Such hearing aids, in contrast to classic hearing aids, are not provided to compensate for hearing losses, but are used deliberately to assist and improve the normal human sense of hearing in specific hearing situations.

Independently of the provided intended use, hearing aids typically include at least one input transducer, a signal processing device, and an output transducer as essential components. The at least one input transducer is generally formed here by an acoustoelectric transducer, thus, for example, by a microphone, or by an electromagnetic receiver, for example an induction coil. In many cases, multiple input transducers are furthermore installed, thus, for example, one or more acoustoelectric transducers and an electromagnetic receiver. An electroacoustic transducer is typically used as the output transducer, for example a miniature loudspeaker (which is also referred to as a "receiver"), or an electromechanical transducer, for example a bone vibrator. The signal processing device is generally formed by an electronic circuit implemented on a circuit board and independently thereof typically includes an amplifier.

Furthermore, typically two basic types of structures or designs are distinguished in hearing aids. Hearing aids of the one basic type are referred to as behind-the-ear hearing aids, abbreviated BTE hearing aids, and hearing aids of the other basic type are referred to as in-the-ear hearing aids, abbreviated ITE hearing aids. BTE hearing aids include in this case, in addition to a main module, which is worn behind the ear, an earpiece connected to the main module, which is provided for placement in an auditory canal. In the case of ITE hearing aids, in contrast, the hearing aid as a whole is inserted for use into an auditory canal.

In order that an air exchange can still take place between the auditory canal and the surroundings even with inserted earpiece or hearing aid, corresponding earpieces or hearing aids include a so-called vent in some cases. This is a bore or a channel which penetrates the earpiece or the ITE hearing aid and through which an air exchange and thus in particular also a pressure equalization can take place.

A corresponding vent is accompanied by both advantages and disadvantages. On the one hand, for example, the risk of inflammations in the auditory canal may be reduced by a corresponding vent. In addition, so-called occlusion effects, which are typically perceived as unpleasant, may be reduced or avoided. On the other hand, soundwaves which are generated by the hearing aid and emitted into the auditory canal can also escape through a corresponding vent. Therefore, in particular lower frequencies typically have to be emitted additionally amplified into the auditory canal. Moreover, undesired feedback is enabled or amplified by a corresponding vent.

SUMMARY OF THE INVENTION

Proceeding therefrom, the invention is based on the object of specifying an advantageous method for operating a hearing aid and an advantageously designed hearing aid.

This object is achieved according to the invention by a method having the features of the independent method claim and by a hearing aid having the features of the independent hearing aid claim. The dependent claims contain preferred refinements. The advantages and preferred embodiments listed with respect to the method are also transferable accordingly to the hearing aid and vice versa.

With the foregoing and other objects in view there is provided, in accordance with the invention, a method for operating a hearing aid, the hearing aid having an input transducer, a signal processing device, and an output transducer. The method includes determining an occurrence of a comb filter effect by means of the signal processing device and controlling a countermeasure by means of the signal processing device in dependence on the occurrence of the comb filter effect determined.

The method according to the invention is used here to operate a hearing aid and is accordingly designed for this purpose. Vice versa, a hearing aid according to the invention is configured in such a way that the method according to the invention is executable thereby and is also executed in at least one operating mode. In this case, the hearing aid is typically configured as one of the hearing aids described at the outset and preferably as a classic hearing aid.

Depending on the application, the hearing aid is furthermore configured as a behind-the-ear hearing aid, or as an ITE hearing aid. If the hearing aid is designed as a BTE hearing aid, in addition to a main module, it includes an earpiece connected to the main module, which is provided for placement in an auditory canal. Independently thereof, the hearing aid preferably includes a vent described at the outset, which is formed in the earpiece or in the ITE hearing aid itself, depending on the design of the hearing aid.

In any case, however, the hearing aid includes a first input transducer, a signal processing device, and an output transducer. The first input transducer is used here to generate first electrical input signals based on first acoustic input signals, which are incident on the input side on the hearing aid. For this purpose, the first input transducer expediently includes an acoustoelectric transducer, thus in particular a microphone. The first electrical input signals generated in operation of the hearing aid are then processed in the signal processing device, wherein electrical output signals are generated based on the first electrical input signals. Finally, acoustic output signals are generated by the output transducer based on the electrical output signals and emitted from the hearing aid on the output side, in particular into an auditory canal of a hearing aid wearer. For this purpose, the output transducer typically includes an electroacoustic transducer, for example a loudspeaker.

The hearing aid is preferably furthermore configured as a digital hearing aid. The first input transducer is then used to generate first digital input signals based on the first acoustic input signals and additionally includes an analog-to-digital converter for this purpose. The corresponding first digital input signals are then processed in operation of the hearing aid in the signal processing device, wherein digital output signals are generated based on the first digital input signals. The output transducer in turn then additionally includes a digital-to-analog converter and generates the acoustic output signals based on the digital output signals.

If the hearing aid is furthermore designed as a digital hearing aid, the signal processing device is thus furthermore preferably configured to form signal processing modules or data processing modules, thus, for example, by software program modules.

Independently thereof, the hearing aid according to the invention is configured in such a way that in at least one operating mode, an occurrence of a comb filter effect is determined by means of the signal processing device and a countermeasure is controlled as a function thereof.

The implementation of the method steps of determining and/or controlling is carried out in this case, for example, by means of one or more of the above-mentioned signal processing modules or data processing modules. Alternatively or additionally, the signal processing device includes a number of additional electronic modules for the method steps determining and/or controlling.

The method according to the invention is based on the knowledge here that in a hearing aid, an undesired change of the perceived sound picture can be induced by a comb filter effect. A comb filter effect fundamentally occurs here whenever a sound signal from the environment meets a sound signal generated by the hearing aid. This is because, on the one hand, the sound signal generated by the hearing aid, except for the amplification, essentially corresponds to a copy of the sound signal from the environment and, on the other hand, due to the signal processing in the hearing aid, there is typically a time delay between the sound signal from the environment and the sound signal generated by the hearing aid. Such a comb filter effect is annoying whenever the corresponding sound signals meet in the auditory canal of a user and have comparable amplitudes in this case, since then a perceptible interference occurs, which influences the sound picture in an undesired manner. Comparable amplitudes can occur here, inter alia, when the hearing aid has a vent, as is preferred.

To counter this problem, the hearing aid is configured in such a way that in at least one operating mode, an occurrence of a comb filter effect is determined by means of the signal processing device. The occurrence is expediently determined in this case whenever the comb filter effect induces an undesired change of the perceived sound picture, thus when the comb filter effect reaches or exceeds a specified intensity, for example.

As a function of the determined occurrence, a countermeasure is then controlled by the signal processing device. I.e., for example, the signal processing in the signal processing device, in which electrical output signals are generated based on the electrical input signals, is adapted to reduce the comb filter effect or at least its influence on the perceptible sound picture.

In an advantageous refinement, an assessment variable is moreover determined by means of the signal processing device, which represents an intensity of the occurring comb filter effect. I.e., it is not only determined when the comb filter effect occurs or exceeds a specified intensity threshold, but rather how strongly the comb filter effect is presently pronounced. For this purpose, the assessment variable or a current value for the assessment variable is determined. The countermeasure is then controlled as a function of this assessment variable or the current value.

Depending on the application, the assessment variable is determined here as a function of an auxiliary variable, which corresponds to a quotient, for example. The auxiliary variable preferably corresponds, however, to a difference and in particular a so-called peak-to-valley value.

Furthermore, the auxiliary variable is preferably determined in that two values, namely a first value and a second value, of a base variable are compared to one another. The corresponding base variable expediently corresponds in this case to a sound variable or at least has a functional relationship to a sound variable. The first value is then preferably assigned to a constructive interference frequency of the comb filter effect and the second value is assigned to a destructive interference frequency of the comb filter effect.

In this case, constructive interference frequencies of the comb filter effect designate those frequencies at which amplitude maxima occur due to constructive interference of sound signals in the auditory canal. Accordingly, destructive interference frequencies of the comb filter effect designate those frequencies at which amplitude minima occur due to destructive interference of sound signals in the auditory canal.

In addition, it is expedient if the signal processing device is configured for multiple operating modes. In some embodiment variants, a set of frequencies to be monitored is stored here for each of these operating modes, wherein the sets of at least two operating modes typically differ. Such a set then typically includes at least one constructive interference frequency and at least one destructive interference frequency, wherein the interference frequencies are expediently derived from a fixed or specified delay time value. The corresponding delay time value in turn indicates at least in good approximation here how long the signal processing in the hearing aid lasts when the hearing aid is operated in the corresponding operating mode.

Depending on the application, it is additionally advantageous if a current delay time value is determined by means of the signal processing device. In this case, a set of frequencies currently to be monitored is then furthermore preferably determined as a function of the determined current delay time value, at which constructive or destructive interferences are to be expected due to the comb filter effect. The current delay time value is determined here, for example, with the aid of a measurement pulse. This pulse is inserted, for example, into the first electrical input signal or the first digital input signal and read out from the electrical output signal or the digital output signal (possibly in modified form), wherein the time difference between insertion and readout is determined as the delay time value.

Independently thereof, the frequencies to be monitored are preferably monitored in that sound variable values, thus in particular sound variable values assigned to these frequencies, are determined, for example for the above-mentioned auxiliary variable.

It is additionally advantageous if the hearing aid includes an additional input transducer, namely a second input transducer, which generates an additional second input signal in operation of the hearing aid, thus in particular a second electrical and/or a second digital input signal. The second input transducer is then expediently provided here for positioning in an auditory canal and thus for detecting sound in a spatial area between eardrum and earpiece or ITE hearing aid.

The occurrence of the comb filter effect and/or a current delay time value is then preferably furthermore determined by an evaluation of the additional second input signal. Alternatively, the occurrence of the comb filter effect and/or a current delay time value is determined by a joint evaluation of the first electrical or digital input signal and the additional second electrical or digital input signal.

Independently thereof, the evaluation of the first electrical or digital input signal and/or the additional second electrical or digital input signal to determine the occurrence of the comb filter effect preferably takes place in parallel to and independently of the signal processing to implement the main function of the hearing aid, thus the amplification of acoustic signals. A separate and thus additional signal processing path is thus preferably implemented for the evaluation to determine the occurrence of the comb filter effect, for example by means of separate signal processing modules or data processing modules and/or by means of a number of additional electronic modules, for example by means of a separate additional processor or processor core. Furthermore, an adapted spectral analysis is preferably carried out in this separate signal processing path and in particular the use of a filter bank is omitted. Preferably, however, the filter bank which is used for the implementation of the main function is at least not used.

Moreover, it is expedient if averaging is carried out over a specified period of time. That is to say in particular that the above-mentioned variables, thus the assessment variable, the auxiliary variable, the base variable, and/or the values of the base variable compared to one another are preferably variables averaged over a specified period of time. Depending on the application, a value greater than or equal to 200 ms is typically specified for the corresponding period of time here. A value greater than or equal to 500 ms and in particular greater than or equal to 1 s is preferably specified here.

For the above-mentioned countermeasure, furthermore at least three intensities, degrees of severity, or steps are preferably implemented. The countermeasure is then controlled in that the signal processing device changes between the intensities, degrees of severity, or steps. In this case, the countermeasure is thus not only activated or deactivated.

Depending on the application, the amplification is adapted by the signal processing device as a countermeasure, for example. The adaptation takes place, for example, individually for individual frequencies or individual frequency bands. I.e., different adaptations are performed for various frequencies or frequency bands. The amplification is reduced here in the case of some variants, at least for individual frequencies or individual frequency bands. In an advantageous refinement, this reduction of the amplification is implemented by at least one auxiliary filter, then at least one additional filter is thus applied. Alternatively, the amplification is adapted in that it is increased, at least for individual frequencies or individual frequency bands.

Alternatively or additionally to adapting the amplification, in some applications a countermeasure takes place in which an additional time delay is implemented, at least for individual frequencies or individual frequency bands. The adaptation takes place here, for example, individually for individual frequencies or individual frequency bands. I.e., different additional time delays are implemented for different frequencies or frequency bands.

In turn alternatively or additionally, an activation of a provided vent takes place as a countermeasure. The corresponding vent is then expediently designed for this purpose as an adaptive, controllable, settable, or adjustable vent, in which typically at least one geometric parameter is changeable by activation, thus, for example, an effective opening cross section or an effective cross section.

Independently thereof, the hearing aid is furthermore preferably configured for so-called machine learning. I.e., the method described here is typically implemented by means of an algorithm and this algorithm is preferably automatically adapted with time, for example based on statistical data which are automatically collected, stored, and evaluated in the hearing aid.

Other features which are considered as characteristic for the invention are set forth in the appended claims.

Although the invention is illustrated and described herein as embodied in a method for operating a hearing aid and a hearing aid, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

BRIEF DESCRIPTION OF THE FIGURE

The figure of the drawing is a block diagram of a hearing aid.

DETAILED DESCRIPTION OF THE INVENTION

Turning now to the single figure of the drawing in detail, there is shown a hearing aid 2 described by way of example is configured as a classic hearing aid. The hearing aid 2 in the exemplary embodiment corresponds in the structural form to an in-the-ear hearing aid, abbreviated ITE hearing aid, and has a so-called vent 4.

Furthermore, the hearing aid includes as essential components a first input transducer 6, a signal processing device 8, and an output transducer 10. The first input transducer 6 is used here to generate first electrical input signals based on acoustic input signals which are incident on the hearing aid 2 on the input side. The first electrical input signals generated in operation of the hearing aid 2 are then evaluated and processed in the signal processing device 8, wherein electrical output signals are generated based on the first electrical input signals. Finally, acoustic output signals are generated by the output transducer based on the electrical output signals and emitted from the hearing aid 2 on the output side.

In addition, the hearing aid 2 has an additional second input transducer 12, using which additional second electrical input signals are generated in operation based on acoustic input signals. The first input transducer 6 and the second input transducer 12 are arranged here on opposite sides of the hearing aid 2. The first input transducer 6 is then used to generate first electrical input signals based on acoustic input signals, which are incident on the hearing aid 2 on the input side, and the additional second input transducer 12 is used to generate second electrical input signals based on acoustic input signals, which are incident on the hearing aid 2 on the output side, thus on the side of the hearing aid 2 which faces toward an eardrum of a user when the hearing aid 2 is being worn.

The signal processing device 8 is furthermore configured for multiple operating modes in the exemplary embodiment. A set of frequencies to be monitored is stored here for each of these operating modes. Such a set of frequencies to be monitored includes at least one constructive interference frequency and at least one destructive interference frequency, wherein the interference frequencies are derived from a fixed delay time value. The delay time value is selected here so that it reflects at least in good approximation how long the signal processing lasts in the hearing aid 2 when the hearing aid 2 is operated in the corresponding operating mode.

Constructive interference frequencies designate in this case those frequencies at which amplitude maxima occur due to a comb filter effect because of constructive interference of sound signals in the auditory canal of the user. Accordingly, destructive interference frequencies designate those frequencies at which amplitude minima occur because of destructive interference of sound signals in the auditory canal.

The frequencies to be monitored are furthermore monitored by the signal processing device 8, in that the additional second input signals are evaluated by the additional second input transducer 12. The current sound amplitudes are determined in this case for the frequencies to be monitored in the exemplary embodiment. Furthermore, at least one auxiliary variable is determined by the signal processing device 8 in the exemplary embodiment. This at least one auxiliary variable corresponds by way of example to the difference of two current sound amplitude values. The first of these sound amplitude values is assigned to the at least one constructive interference frequency from the set of the frequencies to be monitored and the second of these sound amplitude values is assigned to the at least one destructive interference frequency from the set of frequencies to be monitored.

The at least one auxiliary variable represents a representative variable for the occurrence or the intensity of a comb filter effect and, based on the at least one auxiliary variable, an assessment variable is derived by the signal processing device 8 in the exemplary embodiment, which is used to control a countermeasure against the comb filter effect.

As a countermeasure, for example, an adaptation of the amplification is carried out by the signal processing device 8, thus the signal amplification by the hearing aid 2. The amplification is typically adapted individually here for individual frequencies, namely in particular for the interference frequencies, or individual frequency bands.

Alternatively or additionally, an activation of the vent 4 is carried out as a countermeasure by the signal processing device 8, at least in cases in which the vent 4 is configured as a vent 4 settable via an activation. In these cases, the vent 4 has a mechanism 14, by the activation of which at least one geometric parameter of the vent 4 is adjustable or settable, thus, for example, its effective cross section.

The following is a summary list of reference numerals and the corresponding structure used in the above description of the invention.

LIST OF REFERENCE NUMERALS

2 hearing aid
4 vent
6 input transducer
8 signal processing device
10 output transducer
12 additional input transducer
14 mechanism

The invention claimed is:

1. A method for operating a hearing aid, the hearing aid having an input transducer, a signal processing device, and an output transducer, the method comprises the steps of:
determining an occurrence of a comb filter effect by means of the signal processing device;
determining a current delay time value by means of the signal processing device, wherein a time difference between an insertion of a measurement pulse into an input signal and a readout of the measurement pulse from an output signal is determined as the current delay time value, wherein current frequencies to be monitored are determined in dependence on the current delay time value determined, at which constructive or destructive interferences are to be expected due to the comb filter effect; and
controlling a countermeasure by means of the signal processing device in dependence on the occurrence of the comb filter effect determined by controlling an adjustable vent as the countermeasure.

2. The method according to claim 1, which further comprises:
determining an assessment variable by means of the signal processing device, the assessment variable represents an intensity of an occurring said comb filter effect; and
controlling the countermeasure in dependence on the assessment variable.

3. The method according to claim 2, which further comprises determining the assessment variable in dependence on an auxiliary variable and wherein the auxiliary variable corresponds to a difference or a quotient.

4. The method according to claim 3, wherein the auxiliary variable is determined in that two values of a base variable are compared to one another, wherein the base variable corresponds to a sound variable or has a functional relationship to the sound variable, wherein a first value of the two values is assigned to a constructive interference frequency of the comb filter effect and wherein a second value of the two values is assigned to a destructive interference frequency of the comb filter effect.

5. The method according to claim 1, wherein the signal processing device is configured for a plurality of operating modes, wherein a set of frequencies to be monitored is stored for each of the operating modes.

6. The method according to claim 1, which further comprises determining the occurrence of the comb filter effect and/or a current delay time value by evaluation of an additional input signal by the signal processing device and wherein the additional input signal is generated by an additional input transducer, which is provided for positioning in an auditory canal.

7. The method according to claim 1, wherein at least three intensities are implemented for the countermeasure and wherein the countermeasure is controlled in that the signal processing device changes between the intensities.

8. A hearing aid, comprising:
an input transducer;
a signal processing device;
an output transducer; and
the hearing aid is configured to execute a method according to claim 1 in at least one operating mode.

* * * * *